United States Patent [19]
Kazemzadeh

[11] Patent Number: 6,088,957
[45] Date of Patent: Jul. 18, 2000

[54] SEED-CONTAINING FERTILIZER PACKAGE

[75] Inventor: Massoud Kazemzadeh, Bloomington, Minn.

[73] Assignee: MJM Technologies, L.L.P., Stacy, Minn.

[21] Appl. No.: 08/946,434

[22] Filed: Oct. 7, 1997

Related U.S. Application Data

[60] Provisional application No. 60/028,021, Oct. 9, 1996.

[51] Int. Cl.[7] .................................................. A01B 79/00
[52] U.S. Cl. .................................. 47/58.1; 47/56; 47/57.6
[58] Field of Search ............................... 47/58.1, 56, 57.6

[56] References Cited

U.S. PATENT DOCUMENTS

| | | |
|---|---|---|
| 4,232,481 | 11/1980 | Chamoulaud . |
| 4,297,810 | 11/1981 | Hansford . |
| 4,345,856 | 8/1982 | Tuck . |
| 4,414,776 | 11/1983 | Ball . |
| 4,584,790 | 4/1986 | Gaughen . |
| 5,010,685 | 4/1991 | Sakamoto et al. . |
| 5,022,182 | 6/1991 | Anderson . |
| 5,043,007 | 8/1991 | Davis . |
| 5,047,078 | 9/1991 | Gill . |
| 5,125,770 | 6/1992 | Hesseling et al. . |
| 5,207,826 | 5/1993 | Westland et al. . |
| 5,235,781 | 8/1993 | Holley . |
| 5,274,951 | 1/1994 | Besing . |
| 5,317,834 | 6/1994 | Anderson . |
| 5,516,830 | 5/1996 | Nachtman et al. . |

*Primary Examiner*—Leon B. Lankford, Jr.
*Attorney, Agent, or Firm*—Merchant & Gould P.C.

[57] ABSTRACT

This disclosure concerns affixing various seeds, such as grass seeds, to surfaces or cavities of specially manufactured fertilizer carriers formed into various shapes, e.g. star crosssections, tri-lobe or multi-lobe profiles, or cup-like or similar cavity-containing shapes. This shape and the manner of manufacturing of the fertilizer provides grooves and cavities or areas to which the seed can be affixed to the fertilizer and protected against damage during shipping and handling. The fertilizer carrier also acts as a nutrient source for the seed while the seed is most vulnerable, i.e. during its emergence from the seed coat and the first few days after emergence.

16 Claims, 3 Drawing Sheets

SEED-CONTAINING FERTILIZER PACKAGE

This application claims benefit of Provisional Application Ser. No. 60/028,021, filed Oct. 9, 1996.

BACKGROUND OF THE INVENTION

With increasing global population and continuing modernization in developed countries, the amount of waste generated due to processing food, lumber, paper and other products has become a serious problem. The treatment of biological sludge, including municipal sewage sludge, has become an increasingly difficult due to the large volumes of such wastes. There is an increased environmental awareness and body of regulations covering the processing and disposal of such waste. There are few methods by which to stabilize such wastes, either by heat treatment, burning, composting or through chemical treatment and landfilling. These have major future repercussions. Composting is expensive, time consuming, and causes off odors and possible outbreaks of disease. Burning only defers the problem, and adds to the accumulation of various compounds in our atmosphere. Landfills, presently deployed by most advanced societies, make the land unusable for extended periods of time, due to generation of various gases from byproducts of decomposition. Biopolymeric waste from food production and food cleaning frequently represents lost nutritional value in addition to the disposal problem.

The protection of viable seeds within the horticultural fields is also a serious problem. Seeds in presently marketed form become inactivated or lose viability when damaged, e.g. by automated loading or conveying equipment, or from falling onto cement or other hard surfaces.

The containment of water and nutritional factors around the seed to growing of the seeds to a stable seedling, is being investigated. Economics of such products and processes are the key factors in their application to a given market. A collection of seeds in a protective fertilizer shell would be ideal for most markets within this field, and for the airborne application of seeding for trees and other larger plants, as in reseeding of a forest. If the fertilizer carrier is designed to protect the seed as well as stay intact during application and handling of the seed, then most of the above problems are solved.

SUMMARY OF THE INVENTION

To address the above challenges and meet other needs, there is provided a seed-containing fertilizer package. The package includes a stable, cohesive and substantially uniform carrier matrix containing moisture at less than about fourteen percent, by weight. The carrier matrix is shaped to define a carrier surface having a carrier surface length and a carrier surface width. The package further incorporates a viable seed product including multiple individual seeds. Each seed particle has a length of at most about one-fifth of the carrier surface length. An adhesive medium bonds the seeds to the carrier surface.

Another aspect of the invention is a process for forming a seed-containing fertilizer package, including the following steps:

a. shaping a material mass including organic waste into a cohesive and substantially uniform carrier matrix having a carrier surface;

b. drying the carrier matrix until it contains moisture at less than about fourteen percent by weight;

c. applying a liquid adhesive to the carrier matrix at least along the carrier surface;

d. combining a viable seed product consisting essentially of multiple individual seeds with the carrier matrix, and mixing the carrier matrix and the seeds to cause the biological product to adhere to the carrier matrix at least along the carrier surface; and e. drying the carrier matrix and the adhered viable seed product.

The seed-containing fertilizer package and process for its manufacture solve the above problems at minimum cost, by utilizing wastes from various sources to combine and formulate a final product which has a good nutritional profile and water holding capacity in which the seedling can grow. Various waste streams are used, as well as a process of either extruding at high temperatures or molding a fertilizer carrier to protect the seeds deposited within specified cavities, combined with employing a surface adherent which has low water activity to the extent that the germination of the seed is delayed until the desired time of use by the consumer.

The fertilizer is manufactured and formed from a medium such as sludge from waste water treatment, with other ingredients such as waste paper, garden cuttings, or other organic compounds, to produce a matrix which adheres to itself, forming a strong cohesive article. This allows the pellet or article to be formed into a cross-sectional star or grooved shape by the extrusion of such medium through a die. Extruded pellets formed from this process can be dried, and the particulate fertilizer pellet can then be coated with an adherent or glue-like medium with low water activity of less than 0.65 Aw, after drying to less than ten percent moisture by weight. The pellet with its adherent coating is then coated gently with various desired seeds using a tumbler, thereby resulting in a pellet which contains the desired seeds on the surface within its grooves or cavities. This combination of seed and fertilizer pellet is then gently dried to a moisture level of less than about fourteen percent using high air volume and a low temperature of less than 120° F. dryer in order not to damage the seed activation.

In the case of molding of the fertilizer, the mixed slurry or batter-like product is deposited or injection-molded within a molding chamber in which the fertilizer mixture is heated and cooked. The process both sterilizes the fertilizer and kills all bacteria activity, while providing enough energy for the components of the fertilizer to go through a glass transition stage and develop a cross-linked consistency. This results in a continuous internal matrix and a composite single-piece unit in which the seeds can then be implanted or affixed to the provided cavity at a later stage of processing. The fully formed fertilizer carrier is then dried to required moisture levels of less than about fourteen percent by weight, and continues on in the process of becoming a carrier of seeds.

IN THE DRAWINGS

FIG. 1 illustrates a variety of differently shaped seed carrier pellets constructed according to the present invention;

FIG. 2 schematically illustrates a process for manufacturing the seed carrier pellets and adding the seeds; and FIG. 3 illustrates several alternative seed and seed carrier constructions.

DETAILED DESCRIPTION

Figure 1A:
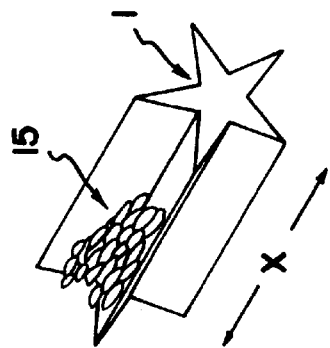
Figure 1F:
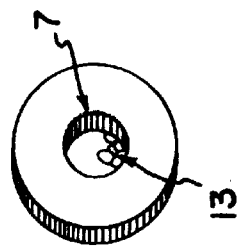
Figure 1B:
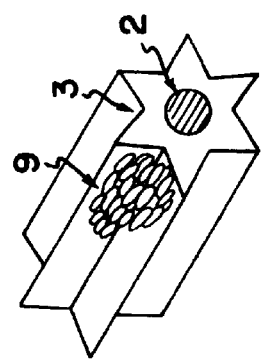
Figure 1G:
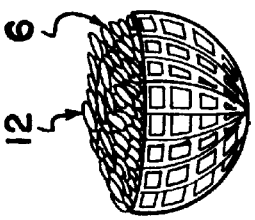
Figure 1D:
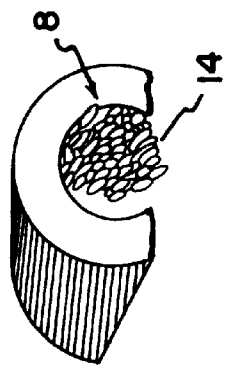
Figure 1C:
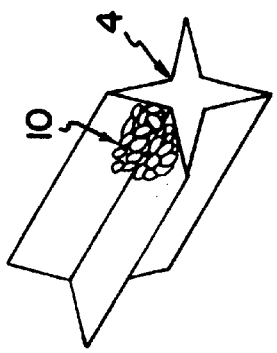
Figure 1E:
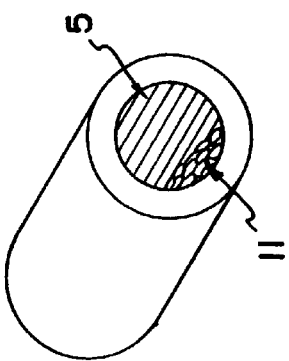

Turning now to the drawings, FIG. 1 illustrates seven different constructions or profiles of carriers for seeds. The carriers protect the seeds and have a high water-holding capacity for providing moisture to the seeds. Part (a) of FIG.

1 shows a star-shaped profile providing five grooves for containing seeds. Seeds 15 are shown in one of the grooves. Part (b) shows an alternative star-shaped profile including a central opening 2 and several grooves for containing seeds 9. Part (c) illustrates another star configuration 4 with grooves for containing seeds 10.

Part (d) shows a somewhat C-shaped seed carrier 8 containing seeds 14. Part (e) illustrates a seed carrier 5 that completely surrounds seeds 11 contained in the central opening. Likewise, part (f) illustrates seeds 13 contained within a central opening of a disk-like carrier. The extruded carriers in parts (a)–(f) are generally cylindrical, in the sense that they have respective longitudinal axes, each matrix being uniform in transverse profiles taken along its longitudinal axis. The circular cylinders provide annular carrier surfaces for the seeds. The carriers with star-shaped profiles include projections or lobes that extend radially outward from the longitudinal axis, with the carrier surfaces disposed along channels or grooves between adjacent projections. Finally, part (g) shows a hemispherical, shell-like construction 6 containing seeds 12. Carrier 6 is not extruded, but formed with a mold or other shaping device.

Such fertilizer carriers can be manufactured from waste materials such as sludge, from waste water treatment, starch or proteins from food processing wastes, or fibers and ash from wood milling operations or various furnace operations. The fertilizer carrier can also be formulated in a manner to fulfill the fertilizer requirements of a given market by the addition of ammonia gas or liquid ammonia during or before or after the processing, extruding and forming. Other organic polymers, such as sugars and bloodmeal and starches, can be used to modify the pellet to produce an organic or semi-organic fertilizer. Such pellets or carriers may not require high sterilizing temperatures to remove off odors; thus, components may or may not go through complete melt phases during processing, wherein all or some or one of its components may change phase, thereby entering or proceeding into a glass transition phase which would then require heat and some pressure. The fertilizer carrier may be formulated using a gluing agent within the formulation so that, upon drying the pellet, the product would adhere to itself with all components being unchanged in phase except the gluing agent, which may go from a liquid or amorphous phase to a crystalline phase. The shapes and the final form of the fertilizer carrier can vary from a profile of extruded rod-like shape that is cut according to the requirements of the application, or the high moisture slurry may be formed to be deposited within a mold, which then is heated to about 200° F. (93° C.) and below 450° F. (232° C.). This would allow the fertilizer to be shaped in a manner to contain the seeds at a given location within a cup-like cavity.

Figure 2:
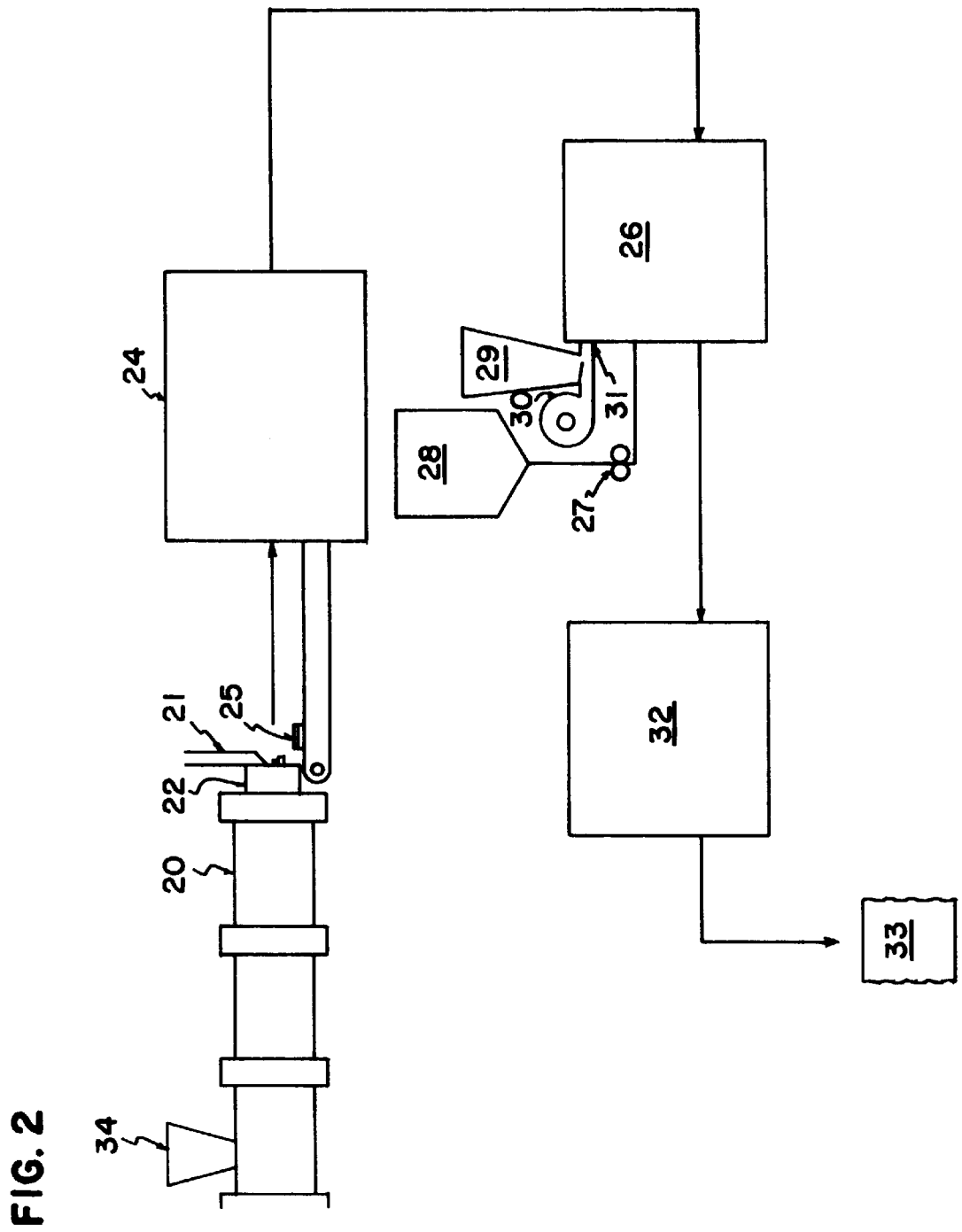

FIG. 2 shows the process for forming the seed carriers, and for combining seeds with the carriers. Premixed fertilizer in powder or granular form is loaded into a cooking extruder 20 through a hopper 34. The material can be selected and processed as described in U.S. patent application Ser. No. 08/561,376 filed Nov. 21, 1995. That application, filed on behalf of the same inventor as this provisional application, is hereby incorporated by reference.

Material exits extruder 20 through a die 22 which determines the profile or shape of the seed carriers. Cutting knives 21 determine carrier lengths, resulting in individual pellets or carriers as indicated at 23. A conveyor moves the carriers to a high temperature dryer 24.

From dryer 24, the pellets are transferred to a spraying and tumbling station 26. A liquid gel or other adherent medium, preferably having low-water activity, is transmitted by a pump 27 from a reservoir 28 to a spray nozzle 25. At the same time, seed from a hopper 29 is transferred into station 26 by an air blower 30 including a low pressure Venturi zone 31, so that seed particles are carried into the station. The seeds and the adherent medium tend to coat the individual seed carriers or pellets.

After tumbling, the coated pellets are provided to a low temperature dryer 32, and to a container 33 after drying.

In an alternative embodiment process, a mold or other shaping device can be used in lieu of the extruder.

The fertilizer can be made totally organic by the use of waste products from an organic source, such as lumber mills, or food or feed processing plants, or other such plants where the blood or feather of such components of the food industry are utilized in the complete formulation of the pellet fertilizer. Such formulas can then be formed, cold or hot, from 125° F. (52° C.) to 450° F. (232° C.), with pressures of 5–1500 psi and shaped into any of the outlined designs provided in previous figures, or similar shapes wherein the protective cavities can be provided for the protection of the seed against compaction damage. After the production and manufacturing of the fertilizer, it is dried to approximately 3–14% moisture, depending on the stability of the pellet at a given moisture content and is then transferred to the coating process.

The coating material in most cases is a liquid with various viscosities, ranging from 50 CP to up to a few million CP, depending on the method of application and adherence of seed to the groove surface of the pellet. The ingredients may include aqueous solutions of various hydrocolloids, such as pregelled starches, various gums and modified cellulose such as carboxyl methyl cellulose or a variety of such compounds, as well as sugars or compounds containing sugars from various sources, such as sucrose, fructose, dextrose, or maltodextrose. Such products, and many others which contain liquids which are volatile at low temperatures and possess a low water activity of 5.5 at moisture contents of less than 15% by weight, can be utilized. Compounds which may be of volatile mixtures other than water can be used with organic or non-organic compounds which provide an adhesive characteristic to the pellet, and at all times possess a low water activity level to prevent the initiation of the germination of the seed, to be added in the next step of the process. The viscosity of the adhesive, whether organic or non-organic is not critical to the process. However, as the adhesive increases in viscosity, the application method of such products must be changed to fit the requirements of the adhesive viscosity. The ideal viscosity of the adherent has to be low enough (100–1000 CP) so that it can be easily applied to the surface as well as the groove area of the pellet in a spray or atomized manner, followed by the application of the seeds in a tumbler. The coating or adhesive may be applied to the grooves, or the total surface, or to the area to which the seed must adhere and may be dried so that lower water activity is achieved, but the adhesive characteristics of the surface remain the same, and may even improved by lower water content.

Application of the seed to the sticky pellets is done via a Venturi, which can spray the dry product onto a surface, or can be done by an applicator, whereby the seeds are deposited on the pellets as they roll by the applicator. once the seed is introduced to the surface of the pellet, the adherent causes the seed to adhere to the surface of the pellets at all of the exposed areas where the surface of the pellet comes in contact with the seed. The grooves where the seeds are affixed to the pellets remain as protective areas. The final pellets will contain most of the seeds within their grooves, while losing the rest of the seeds as the tumbler brushes over the adherent seeds exposed to the tumblers. Alternatively the adhesive can be applied to the seeds, after which the seeds and pellets are combined.

It should be noted that the relative size of the pellets to the seeds is limited and should not be ignored for best results. The seed must not be larger than 1/10 of the total size (length and width) of the pellet and 1/5 of the grooved area (see FIG. 1). other ratios of size and volume may work as well for some seeds due to their size and shape, which makes them more rounded on the edges and thus more easily positioned on the fertilizer pellet. The best results were obtained with the oval or elongated seed shapes, such as grass seeds with a 1/5 long size ratio to the length of the groove on the fertilizer. The smaller the size ratio of seed to the fertilizer, the larger the quantity of seeds which can be accumulated on the fertilizer pellet surface grooves. The size of the seed should not be too small. Seeds with sizes smaller than 2 mm tend to accumulate on the surface of the pellet irrespective of the grooves or cavities. This reduces the protective capability of the pellet for the seeds, and thus increases the waste in the processing as well as increasing the number of seeds which don't germinate after packaging and handling. In order to remove excess seeds of less than 2 mm in size from the surface of the pellets, more tumbling is needed during seed coating to remove the excess seeds. This, under some conditions and for some varieties of seeds, is detrimental to the viability of the seeds being carried on the surface of the pellet.

Figures 3A, 3B, 3C:
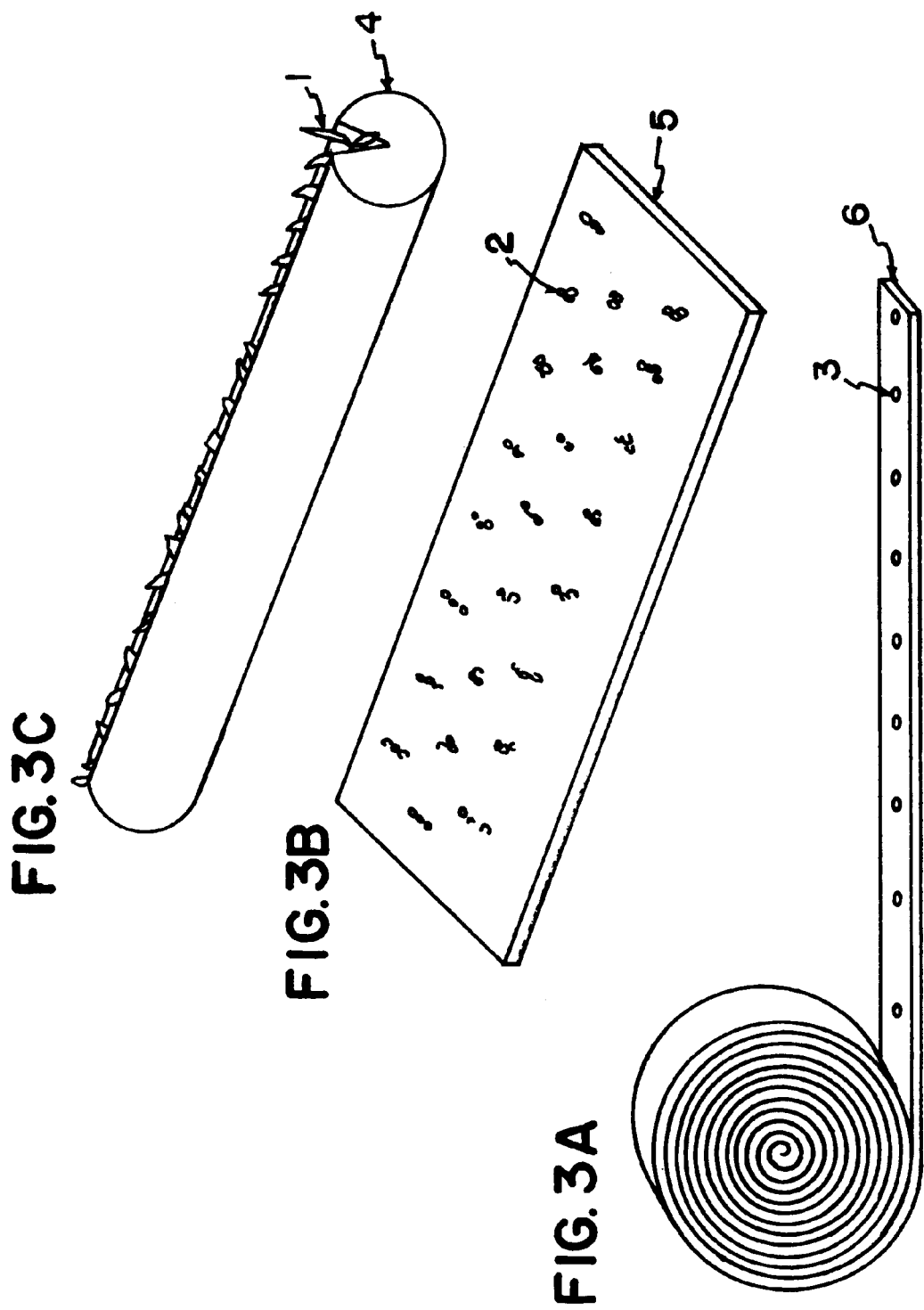

Another approach for the fertilizer to carry seeds is to produce the fertilizer in ribbon or tube form, in such a manner that the seeds are affixed at set intervals along or into the strip using whatever adhesive method is appropriate. In FIG. 3, seeds 3 are shown at predetermined intervals along a carrier roll 6. In part (b) of FIG. 3, seeds 2 are shown arranged on a wider carrier strip 5. This would allow the strip or roll to be placed on top of the soil with little or no soil cover, and yet would still prevent the seeds from blowing away or being damaged during handling or seeding. The ribbon would be produced using an extrusion system such that during the shearing and heating process, and in the presence of moisture, the biopolymers or any other water-soluble polymer mixture would go through a melt phase, forming a continuous matrix. This matrix may expand at the point of exit from the extruder die, thus forming a flexible matrix. The matrix further dissolves readily in ample amounts of water and releases its nutrients. In part (c) of FIG. 3, seeds 1 are shown in a V-shaped groove of an elongate cylindrical carrier 4.

The foregoing seed-containing fertilizer package, including a carrier matrix, seed and adhesive for retaining the seeds, favorably combines seeds and fertilizer for agricultural and horticultural use.

Thus in accordance with the present invention, a seed-containing fertilizer package provides protected carrier surfaces to which seeds can be bonded and thereby protected against damage due to impact. The package can provide a favorable combination of seed and fertilizer, in particular a fertilizer carrier matrix activated by exposure to water to provide nutrients to better ensure and enhance seed growth. The manufacture of the package advantageously utilizes biological waste from a variety of sources such as food processing wastes, lumber milling wastes, garden cuttings, waste paper and waste water treatment sludge, thus enabling the recovery of a significant portion of these wastes for beneficial use.

I claim:

1. A seed-containing fertilizer pellet, comprising:

a stable, cohesive and substantially uniform carrier matrix containing moisture at less than about fourteen percent by weight, and pellet shaped to define a carrier surface having a carrier surface length and a carrier surface width;

a viable seed product composed of multiple individual seeds, each seed having a length of at most about one-fifth of the carrier surface length; and an adhesive medium bonding the seeds to the carrier surface; wherein a portion of the carrier matrix is disposed outwardly with respect to the carrier surface to protect the viable seed product against damage due to impact.

2. The pellet of claim 1 wherein:

said carrier matrix includes a plurality of projections, with said carrier surface including surface regions between and inwardly of said projections.

3. The pellet of claim 1 wherein:

said carrier matrix is cylindrical, and the carrier surface is an annular interior surface of the matrix.

4. The pellet of claim 1 wherein:

said carrier matrix is generally cup-shaped, and the carrier surface is an interior surface of the matrix.

5. The pellet of claim 1 wherein:

said carrier matrix comprises an organic polymer.

6. The pellet of claim 5 wherein:

said organic polymer is derived from one of the following carbohydrates: sugars, starches, and cellulose.

7. The pellet of claim 1 wherein:

said carrier matrix is derived from a waste product including at least one of the following: food processing waste, garden cuttings, waste water treatment sludge, lumber milling waste, and waste paper.

8. The pellet of claim 7 wherein:

said carrier matrix further includes ammonia.

9. The pellet of claim 1 wherein:

said adhesive consists essentially of at least one of the following constituents: hydrocolloids, gums, modified cellulose, gelatins and sugars.

10. The pellet of claim 9 wherein:

said adhesive has a water activity of at most about 0.65 Aw at said moisture content of the carrier.

11. The pellet of claim 1 wherein the carrier matrix comprises a fertilizer derived from organic waste material.

12. The pellet of claim 11 wherein:

said carrier matrix further includes ammonia.

13. A process for forming a stable, cohesive, seed-containing fertilizer pellet, comprising:

processing and shaping a material mass including organic waste by extruding said mass into a cohesive and substantially uniform carrier matrix having a carrier surface in the form of a pellet;

drying the carrier matrix until it contains moisture at less than about fourteen percent by weight;

applying an adhesive to the carrier matrix at least along the carrier surface;

combining a viable seed product consisting essentially of multiple individual seeds with the carrier matrix, and mixing the carrier matrix and the seed product to cause the seeds to adhere to the carrier matrix at least along the carrier surface; and drying the carrier matrix and the adhered product.

14. The process of claim 13 wherein:

the shaping of the material mass comprises extruding the material mass and using a die at an exit end of an extruder to shape the material mass.

15. The process of claim 14 wherein:

said shaping of the material mass includes shaping the material mass within a mold.

16. The process of claim 13 wherein:

said adhesive is a liquid, and the applying of the adhesive includes spraying the adhesive onto the carrier matrix.

* * * * *